United States Patent
Shi et al.

(10) Patent No.: US 7,925,080 B2
(45) Date of Patent: Apr. 12, 2011

(54) METHOD FOR IDENTIFYING MARKED IMAGES BASED AT LEAST IN PART ON FREQUENCY DOMAIN COEFFICIENT DIFFERENCES

(75) Inventors: Yun-Qing Shi, Millburn, NJ (US); ChunHua Chen, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1003 days.

(21) Appl. No.: 11/331,767

(22) Filed: Jan. 13, 2006

(65) Prior Publication Data

US 2007/0177791 A1   Aug. 2, 2007

(51) Int. Cl.
*G06K 9/62* (2006.01)
*G06K 9/00* (2006.01)
*G06K 9/46* (2006.01)
*H04K 1/04* (2006.01)

(52) U.S. Cl. .......... 382/159; 382/100; 382/191; 380/38

(58) Field of Classification Search .................. 382/155, 382/159, 100, 191; 380/38
See application file for complete search history.

(56) References Cited

U.S. PATENT DOCUMENTS

| 5,533,138 | A  | * | 7/1996  | Kim et al. ..................... 382/232 |
| 5,590,064 | A  | * | 12/1996 | Astle ............................. 708/203 |
| 5,680,266 | A  | * | 10/1997 | Park ................................ 360/48 |
| 6,028,636 | A  | * | 2/2000  | Matsui et al. ............ 375/240.18 |
| 6,111,989 | A  | * | 8/2000  | Chang et al. .................. 382/250 |
| 6,628,821 | B1 | * | 9/2003  | Covell et al. .................. 382/155 |
| 6,678,322 | B1 | * | 1/2004  | Mihara .................... 375/240.02 |
| 6,917,902 | B2 | * | 7/2005  | Alexander .................... 702/189 |
| 7,058,979 | B1 | * | 6/2006  | Baudry et al. .................. 726/32 |
| 7,200,592 | B2 | * | 4/2007  | Goodwin et al. ................. 707/6 |
| 2002/0122484 | A1 | * | 9/2002  | Mihara et al. ............ 375/240.04 |
| 2002/0183984 | A1 | * | 12/2002 | Deng et al. ........................ 703/1 |
| 2005/0002569 | A1 | * | 1/2005  | Bober et al. .................... 382/191 |
| 2007/0189600 | A1 |   | 8/2007  | Shi et al. |

OTHER PUBLICATIONS

Manikopoulos et al, Detection of block DCT-based Steganography in gray scale images, 2002 IEEE, pp. 355-358.*
International Search Report and Written Opinion, PCT/US06/01393, Jul. 15, 2008.
International Preliminary Report on Patentabilty issued in related International Application No. PCT/US2006/001393 on Apr. 28, 2009.

* cited by examiner

*Primary Examiner* — Kathleen S Yuan
(74) *Attorney, Agent, or Firm* — Connolly Bove Lodge & Hutz LLP

(57) ABSTRACT

Briefly, in accordance with one embodiment, a method of identifying marked images based at least in part on frequency domain coefficient differences is disclosed.

35 Claims, 6 Drawing Sheets

(a)

(b)

METHOD FOR IDENTIFYING MARKED IMAGES BASED AT LEAST IN PART ON FREQUENCY DOMAIN COEFFICIENT DIFFERENCES

FIELD

This application is related to classifying or identifying content, such as marked images, for example.

BACKGROUND

In recent years digital data hiding has become an active research field. Various kinds of data hiding methods have been proposed. Some methods aim at content protection, and/or authentication, while some aim at covert communication. The latter category of data hiding is referred to here as steganography.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

DETAILED DESCRIPTION

Figure 1:
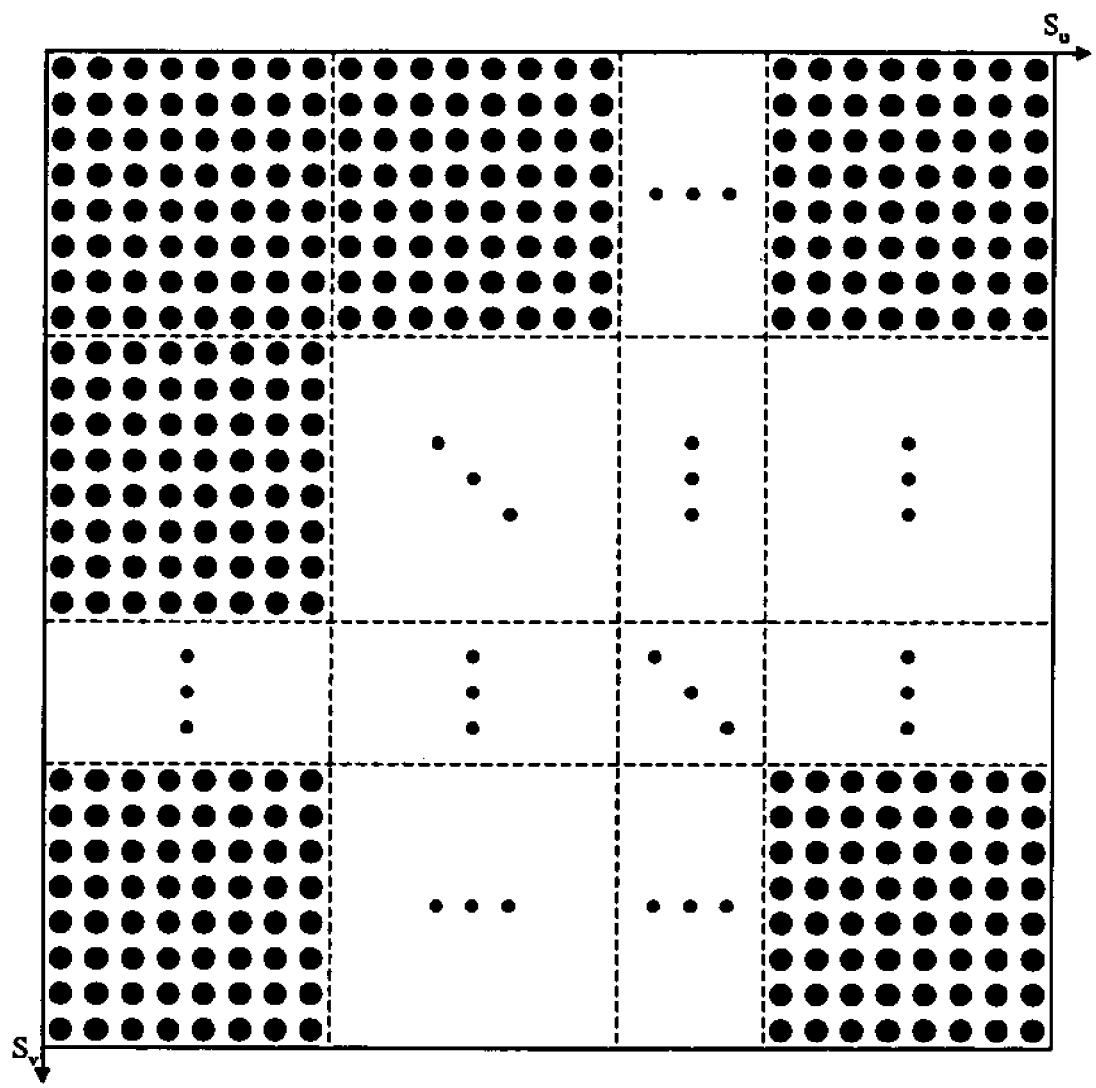
FIG. 1 is a schematic diagram illustrating one embodiment of a portion of a frequency domain coefficient 2-D array.

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Owing to the popular usage of JPEG images, steganographic tools for JPEG images emerge increasingly nowadays, among which model based steganography (MB), F5 and OutGuess are the most advanced. However, it continues to be desirable to develop new tools to identify images that include hidden data. In accordance with claimed subject matter, one embodiment described herein includes a method based at least in part on statistical moments derived at least in part from an image 2-D array and a JPEG 2-D array. In this particular embodiment, a first order histogram and/or a second order histogram may be employed, although claimed subject matter is not limited in scope in this respect. For example, higher order histograms may be utilized in other embodiments, for example. However, continuing with this particular embodiment, from these histograms, moments of 2-D characteristic functions are also used, although, again, other embodiments are not limited in this respect. For example, higher order moments may be employed.

The popularity of computer utilization accelerates the wide spread use of the Internet. As a result, millions of pictures flow on the Internet everyday. Nowadays, the interchange of JPEG (Joint Photographic Experts Group) images becomes more and more frequent. Many steganographic techniques operating on JPEG images have been published and have become publicly available. Most of the techniques in this category appear to modify an 8×8 block discrete cosine transform (BDCT) coefficients in the JPEG domain to embed hidden data. Among the steganographic techniques, the recent published schemes, OutGuess F5, and the model-based steganography (MB) appear to be the most advanced. See, N. Provos, "Defending against statistical steganalysis," 10*th USENIX Security Symposium*, Washington D.C., USA, 2001; A. Westfeld, "F5 a steganographic algorithm: High capacity despite better steganalysis," 4*th International Workshop on Infor-mation Hiding*, Pittsburgh, Pa., USA, 2001; P. Sallee, "Model-based steganography," *International Workshop on Digital Watermarking*, Seoul, Korea, 2003. OutGuess embeds the to-be-hidden data using redundancy of the cover image. In this context, the cover image refers to the content without the hidden data embedded. For JPEG images, OutGuess attempts to preserve statistics based at least in part on the BDCT histogram. To further this, OutGuess identifies redundant BDCT coefficients and embeds data into these coefficients to reduce effects from data embedding. Furthermore, it adjusts coefficients in which data has not been embedded to attempt to preserve the original BDCT histogram. F5, developed from Jsteg, F3, and F4, employs the following techniques: straddling and matrix coding. Straddling scatters the message as uniformly distributed as possible over a cover image. Matrix coding tends to improve embedding efficiency (defined here as the number of embedded bits per change of the BDCT coefficient). MB embedding tries to make the embedded data correlated to the cover medium. This is implemented by splitting the cover medium into two parts, modeling the parameter of the distribution of the second part given the first part, encoding the second part by using the model and to-be-embedded message, and then combining the two parts to form the stego medium. Specifically, the Cauchy distribution is used to model the JPEG BDCT mode histogram and the embedding attempts to keep the lower precision histogram of the BDCT modes unchanged.

To detect hidden information in a stego image, many steganalysis methods have been proposed. A universal steganalysis method using higher order statistics has been proposed by Farid. See H. Farid, "Detecting hidden messages using higher-order statis-tical models", *International Conference on Image Processing*, Rochester, N.Y., USA, 2002. (hereinafter, "Farid") Quadrature mirror filters are used to decompose a test image into wavelet subbands. The higher order statistics are calculated from wavelet coefficients of high-frequency subbands to form a group of features. Another group of features is similarly formulated from the prediction errors of wavelet coefficients of high-frequency subband. In Y. Q. Shi, G. Xuan, D. Zou, J. Gao, C. Yang, Z. Zhang, P. Chai, W. Chen, C. Chen, "Steganalysis based on moments of characteristic functions using wavelet decomposition, prediction-error image, and neural network," *International Conference on Multimedia and Expo*, Amsterdam, Netherlands, 2005, (hereinafter, "Shi et al.), a described method employs statistical moments of characteristic functions of a test image, its prediction-error image, and their discrete wavelet transform (DWT) subbands as features.

However, steganalysis method specifically designed for addressing JPEG steganographic schemes has been proposed by Fridrich. See J. Fridrich, "Feature-based steganalysis for JPEG images and its implications for future design of steganographic schemes," *6th Information Hiding Workshop*, Toronto, ON, Canada, 2004. With a relatively small-size set of well-selected features, this method outperforms other steganalysis methods, such as those previously mentioned, when detecting images that have hidden data created by OutGuess, F5 and MB. See M. Kharrazi, H. T. Sencar, N. D. Memon, "Benchmarking steganographic and steganalysis techniques", *Security, Steganography, and Watermarking of Multimedia Contents* 2005, San Jose, Calif., USA, 2005.

Recently, a scheme was developed to detect data hidden with a spread spectrum method, in which the inter-pixel dependencies are used and a Markov chain model is adopted. See K. Sullivan, U. Madhow, S. Chandrasekaran, and B. S. Manjunath, "Steganalysis of Spread Spectrum Data Hiding Exploiting Cover Memory", the International Society for Optical Engineering, Electronic Imaging, San Jose, Calif., USA, 2005. In this approach, an empirical transition matrix of a given test image is formed. This matrix has a dimensionality of 256×256 for a grayscale image with a bit depth of 8. That is, this matrix has 65,536 elements. These large number of elements make using all of the elements as features challenging. The authors therefore selected several of the largest probabilities of the matrix along the main diagonal together with their neighbors, and some other randomly selected probabilities along the main diagonal, as features. Of course, some information loss is inevitable due to this feature selection process. Furthermore, this method uses a Markov chain along a horizontal direction and, thus, this approach does not necessarily reflect the 2-D nature of a digital image.

Identifying JPEG images in which data has been hidden from JPEG images that do not contain hidden data continues to be desirable. One embodiment in accordance with claimed subject matter involves employing JPEG 2-D arrays. In thois particular embodiment, a JPEG 2-D array is formed based at least in part on JPEG quantized block DCT coefficients. Likewise, difference JPEG 2-D arrays may be formed along horizontal, vertical and diagonal directions for this particular embodiment and a Markov process may be applied to model these difference JPEG 2-D arrays so as to utilize second order statistics for steganalysis. In addition to the utilization of difference JPEG 2-D arrays, a thresholding technique may be applied to reduce the dimensionality of transition probability matrices, thus making the computational complexity of the scheme more manageable.

For this particular embodiment, steganalysis is considered as a task of two-class pattern recognition. That is, a given image may be classified as either a stego image (with hidden data) or as a non-stego image (without hidden data). As mentioned previously, modern steganorgraphic methods, such as OutGuess and MB, have made great efforts to keep the changes of BDCT coefficients from data hiding relatively small and therefore more difficult to detect. In particular, they attempt to keep changes on the histogram of JPEG coefficients relatively small. Under these circumstances, therefore, as is employed in this embodiment, higher order statistics as features for steganalysis may be desirable. Here, in particular, for this embodiment, second order statistics are employed, however, claimed subject matter is not limited in scope in this respect.

For this embodiment, a JPEG 2-D array is formed. Likewise, a difference JPEG 2-D array along different directions is formed. To model the difference JPEG 2-D array using Markov random process, a transition probability matrix may be constructed to characterize the Markov process. Features may then be derived from this transition probability matrix. The so-called one-step transition probability matrix is employed here for reduced computational complexity, although claimed subject matter is not limited in scope in this respect. For example, more complex transition probability matrices may be employed in other embodiments. To further reduce computational complexity, a thresholding technique is also applied, as described in more detail below.

For this embodiment, features are to be generated from a block DCT representation of an image; however, claimed subject matter is not limited in scope in this respect. For example, in alternate embodiments, other frequency domain representations of an image may be employed. Nonetheless, for this particular embodiment, it is desirable to examine the properties of JPEG BDCT coefficients.

For a given image, consider a 2-D array comprising 8×8 block DCT coefficients which have been quantized with a JPEG quantization table, but not zig-zag scanned, run-length coded and Huffman coded. That is, this 2-D array has the same size as the given image with a given 8×8 block filled up with the corresponding JPEG quantized 8×8 block DCT coefficients. Next, apply an absolute value to the DCT coefficients, resulting in a 2-D array as shown in FIG. 1. For this embodiment, this resultant 2-D array is referred to as a JPEG 2-D array. As described in more detail below, the features for this particular embodiment are to be formed from a JPEG 2-D array.

Figure 3:
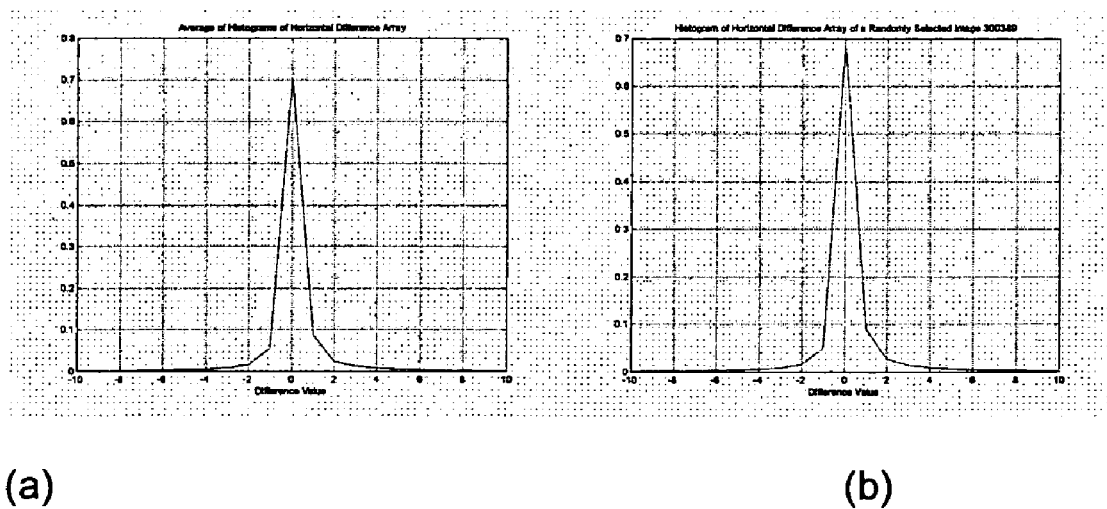
FIG. 3 is a plot illustrating the distribution of coefficient array differences for a set of images.

Without the application of an absolute value operation, JPEG BDCT quantized coefficients may be either positive, or negative, or zero. BDCT coefficients in general do not obey a Gaussian distribution, however, these coefficients are not statistically independent of each other necessary. The magnitude of the non-zero BDCT coefficients may be correlated along the zig-zag scan order, for example. Hence, a correlation may exist among absolute values of the BDCT coefficients along horizontal, vertical and diagonal directions. This observation can be further justified by observing FIG. 3 shown below. That is, the difference of the absolute values of two immediately (horizontally in FIG. 3) neighboring BDCT coefficients are highly concentrated around 0, having a Laplacian-like distribution. A similar observation may be made along vertical and diagonal directions. Thus, as described below, this particular embodiment may exploit this aspect of the coefficients, although, of course, claimed subject matter is not limited in scope in this respect.

A disturbance introduced by data embedding manifests itself more apparently in a prediction-error image than in an original image. Hence, it is desirable to observe differences between an element and one of its neighbors in a JPEG 2-D array. Therefore, in this particular embodiment, the following four difference JPEG 2-D arrays may be employed, although claimed subject matter is not limited in scope in this respect.

Figure 2:
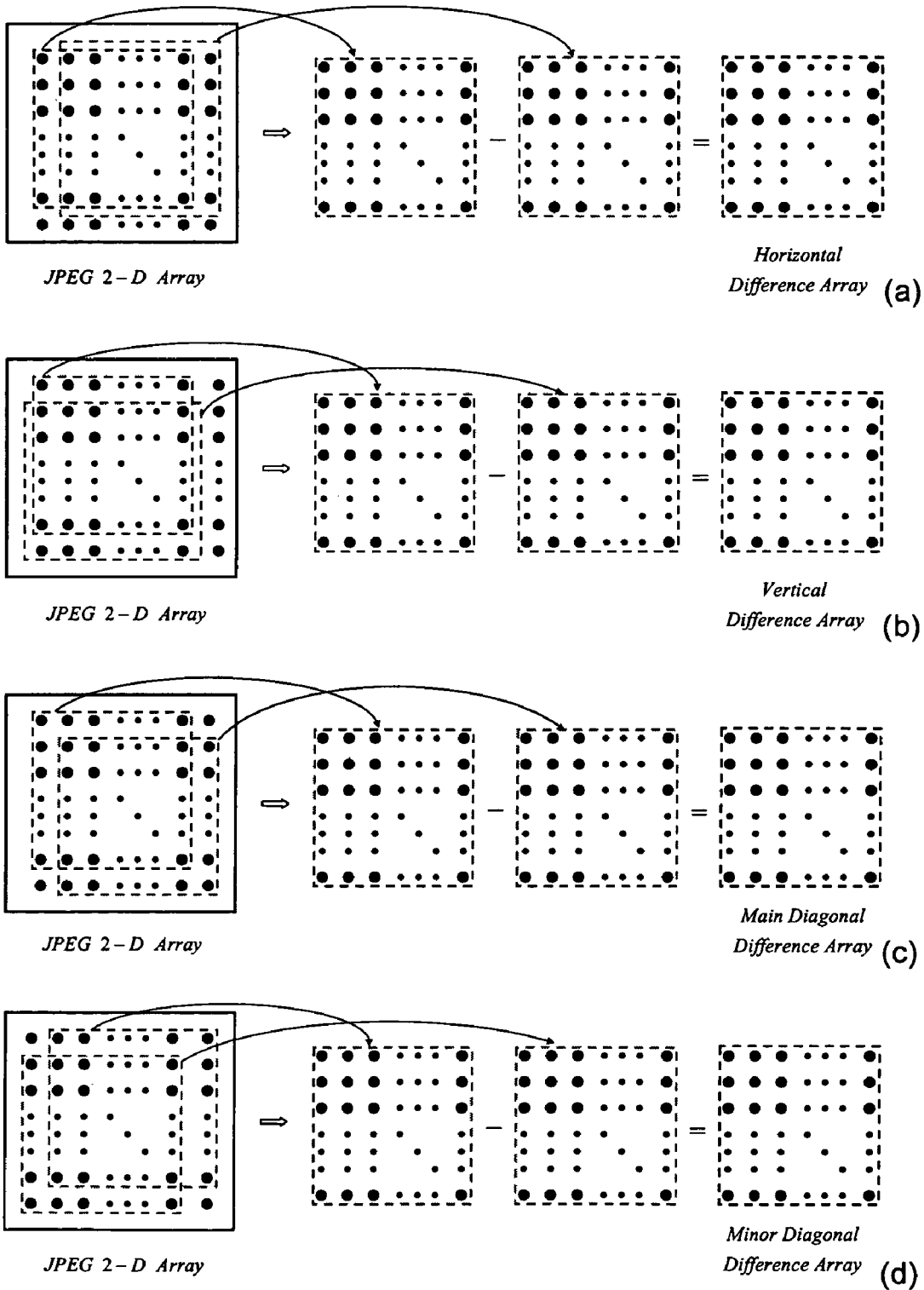
FIG. 2 is a schematic diagram illustrating one embodiment of a technique to generate frequency domain coefficient array differences.

Denote a JPEG 2-D array generated from a given image by $F(u,v)$ ($u \in [1, S_u]$, $v \in [1, S_v]$), $S_u$ is the size of a JPEG 2-D array in horizontal direction and $S_v$ in vertical direction. Then as shown in FIG. 2, difference arrays may be generated as follows:

$$F_h(u,v) = F(u,v) - F(u+1,v), \quad (1)$$

$$F_v(u,v) = F(u,v) - F(u,v+1), \quad (2)$$

$$F_d(u,v) = F(u,v) - F(u+1,v+1), \quad (3)$$

$$F_{md}(u,v) = F(u+1,v) - F(u,v+1), \quad (4)$$

where $u \in [1, S_u-1]$, $v \in [1, S_v-1]$ and $F_h(u,v)$, $F_v(u,v)$, $F_d(u,v)$, $F_{md}(u,v)$ denote difference arrays in the horizontal, vertical, main diagonal, and minor diagonal directions, respectively.

As suggested previously, the distribution of elements of the above-described difference arrays may be Laplacian-like. Most of the difference values are close to zero. For evaluation purposes, an image set comprising 7560 JPEG images with quality factors ranging from 70 to 90 was accumulated. The arithmetic average of the histograms of the horizontal difference JPEG 2-D arrays generated from this JPEG image set and the histogram of the horizontal difference JPEG 2-D array generated from a randomly selected image from this set of images are shown in FIG. 3(a) and (b), respectively. From this figure, most elements in the horizontal difference JPEG 2-D arrays fall into the interval [−T, T] as long as T is large enough. Values of mean and variance of percentage of elements of horizontal difference JPEG 2-D arrays for the image set falling into [−T, T] if T={1, 2, 3, 4, 5, 6, 7} are shown in Table 1. Both FIG. 3 and Table 1 tend to support the view that the distribution of the elements of the horizontal difference JPEG 2-D arrays is Laplacian-like. Similar observations may be made for difference JPEG 2-D array along other directions, such as vertical and diagonal

TABLE 1

| | [−1, 1] | [−2, 2] | [−3, 3] | [−4, 4] | (*) | [−5, 5] | [−6, 6] | [−7, 7] |
|---|---|---|---|---|---|---|---|---|
| Mean | 84.72 | 88.58 | 90.66 | 91.99 | | 92.92 | 93.60 | 94.12 |
| Standard deviation | 5.657 | 4.243 | 3.464 | 2.836 | | 2.421 | 2.104 | 1.850 |

*91.99% is the mean, meaning that on statistic average 91.99% of the elements of horizontal difference arrays generated from the image set fall into the range [−4, 4]. The standard deviation is 2.836%.

As mentioned before, modern steganographic methods, such as OutGuess and MB, have made efforts to keep changes to the histogram of JPEG BDCT coefficients relatively small from data embedding. Therefore, higher order statistics for steganalyzing JPEG steganography may be useful. In this embodiment, second order statistics are used so as not to significantly increase computational complexity, although depending upon the embodiment and application, use of statistics higher than second order may be desirable.

Figure 4:
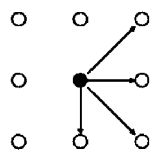
FIG. 4 is a schematic diagram illustrating an embodiment for forming a one-step transition probability matrix, such as to characterize a Markov process.

In this embodiment, a difference JPEG 2-D array is characterized by using a Markov random process. In particular, a transition probability matrix may be used to characterize the Markov process. There are so-called one-step transition probability matrix and n-step transition probability matrix. Roughly speaking, the former refers to the transition probabilities between two immediately neighboring elements in a difference JPEG 2-D array while the latter refers to the transition probabilities between two elements separated by (n−1) elements. For a balance between steganalysis capability and manageable computational complexity, a one-step transition probability matrix is employed for this embodiment, as shown in FIG. 4, although claimed subject matter is not limited in scope in this respect.

To further reduce computational complexity, a thresholding technique may also be employed, although claimed subject matter is not limited in scope in this respect. In this embodiment, a threshold value, here T, is employed. Thus, those elements in a difference JPEG 2-D array whose value falls into $\{-T, -T+1, \ldots, -1, 0, 1, \ldots, T-1, T\}$ is considered. If an element has a value either larger than T or smaller than $-T$, it will be represented by T or $-T$ correspondingly. This procedure results a transition probability matrix of dimensionality $(2T+1) \times (2T+1)$. Of course, again, claimed subject matter is not limited in scope to employing thresholding or to these particular thresholding details. For example, in other embodiments, a threshold level may vary. Nonetheless, for this embodiment, the elements of these four matrixes associated with horizontal, vertical, main diagonal and minor diagonal difference JPEG 2-D arrays are given by:

$$p\{F(u+1, v) = n \mid F(u, v) = m\} = \frac{\sum_{v=1}^{S_v-1}\sum_{u=1}^{S_u-1} \delta(F(u,v)=m, F(u+1,v)=n)}{\sum_{v=1}^{S_v-1}\sum_{u=1}^{S_u-1} \delta(F(u,v)=m)}, \quad (5)$$

$$p\{F(u, v+1) = n \mid F(u, v) = m\} = \frac{\sum_{v=1}^{S_v-1}\sum_{u=1}^{S_u-1} \delta(F(u,v)=m, F(u,v+1)=n)}{\sum_{v=1}^{S_v-1}\sum_{u=1}^{S_u-1} \delta(F(u,v)=m)}, \quad (6)$$

$$p\{F(u+1, v+1) = n \mid F(u, v) = m\} = \frac{\sum_{v=1}^{S_v-1}\sum_{u=1}^{S_u-1} \delta(F(u,v)=m, F(u+1,v+1)=n)}{\sum_{v=1}^{S_v-1}\sum_{u=1}^{S_u-1} \delta(F(u,v)=m)}, \quad (7)$$

$$p\{F(u, v+1) = n \mid F(u+1, v) = m\} = \frac{\sum_{v=1}^{S_v-1}\sum_{u=1}^{S_u-1} \delta(F(u+1,v)=m, F(u,v+1)=n)}{\sum_{v=1}^{S_v-1}\sum_{u=1}^{S_u-1} \delta(F(u+1,v)=m)}, \quad (8)$$

where $m \in \{-T, -T+1, \ldots, 0, \ldots, T\}, n \in \{-T, -T+1, \ldots, 0, \ldots, T\},$ and $$\delta(F(u,v) = m, F(u, v+1) = n) = \begin{cases} 1, & \text{if } F(u,v) = m, F(u, v+1) = n \\ 0, & \text{Otherwise} \end{cases} \quad (9)$$

In summary, for this embodiment, $(2T+1) \times (2T+1)$ elements are obtained for a transition probability matrix. Thus, $4 \times (2T+1) \times (2T+1)$ elements are produced. Likewise, these may be employed as features for steganalysis. In other words, $4 \times (2T+1) \times (2T+1)$ feature vectors have been produced for steganaysis for this particular embodiment.

Figure 5:
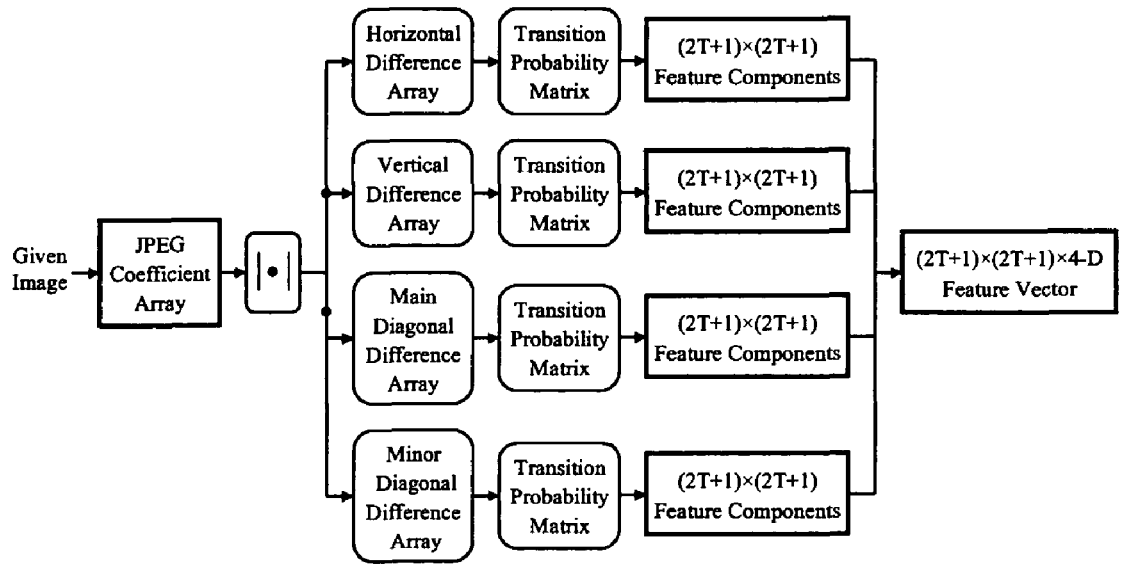
FIG. 5 is a block diagram illustrating one embodiment of generating features.

From data shown in FIG. 3 and Table 1, T in this example is set to 4, although claimed subject matter is not limited in scope in this respect. Hence, for this embodiment, if an element has an absolute value larger than 4, this element is reassigned an absolute value 4 without sign change. The resultant transition probability matrix is a 9×9 matrix for a difference JPEG 2-D array. That is, 9×9=81 elements per transition probability matrix, or equivalently, 81×4=324 elements for this particular embodiment. Feature construction for this particular embodiment is illustrated by a block diagram shown in FIG. 5.

A variety of techniques are available to analyze data, here referred to as features, in a variety of contexts. In this context, we use the term "analysis of variance process" to refer to processes or techniques that may be applied so that differences attributable to statistical variation are sufficiently distinguished from differences attributable to non-statistical variation to correlate, segment, classify, analyze or otherwise characterize data based at least in part on application of such processes or techniques. Examples, without intending to limit the scope of claimed subject matter includes: artificial intelligence techniques and processes, including pattern recognition; neutral networks; genetic processes; heuristics; and support vector machines (SVM).

Although claimed subject matter is not limited in scope to SVM or SVM processes, it may be a convenient approach for two-class classification. See, for example, C. Cortes and V. Vapnik, "Support-vector networks," in Machine Learning, 20, 273-297, Kluwer Academic Publishers, 1995. SVM may, for example, be employed to handle linear and non-linear cases or situations. For linearly separable cases, for example, an SVM classifier may be applied to search for a hyper-plane that separates a positive pattern from a negative pattern.

Thus, while Shi et al., for example, employed neural networks, for this embodiment a support vector machine (SVM) is used as a classifier. SVM is based at least in part on the idea of hyperplane classifier. It uses Lagrangian multipliers to find a separation hyperplane which distinguishes the positive pattern from the negative pattern. If the feature vectors are one-dimensional (1-D), the separation hyperplane reduces to a point on the number axis. SVM can handle both linear separable and no-linear separable cases. Here, training data pairs are denoted by $\{y_i, \omega_i\}, i=1, \ldots, l$, where $y_i \in R^N$ is the feature vector, N is the dimensionality of the feature vectors, and $\omega_i = \pm 1$ for positive/negative pattern class. In this context, an image with hidden data (stego-image) is considered as a positive pattern while an image without hidden data is considered as a negative pattern, although claimed subject matter is not limited in scope in this respect. A linear support vector approach looks for a hyperplane H: $w^T y + b = 0$ and two hyperplanes $H_1$: $w^T y + b = -1$ and $H_2$: $w^T y + b = 1$ parallel to and with substantially equal distances to H with the condition that there are no data points between $H_1$ and $H_2$ and so that the distance between $H_1$ and $H_2$ cannot feasibly be increase, where w and b are the parameters. Once the SVM has been trained, a selection Z from the data may be classified using w and b.

For a non-linearly separable case, a "learning machine" may map input feature vectors to a higher dimensional space in which a linear hyper-plane may potentially be located. In this embodiment, a transformation from non-linear feature space to linear higher dimensional space may be performed using a kernel function. Examples of kernels include: linear, polynomial, radial basis function and sigmoid. A linear kernel may be employed in connection with a linear SVM process, for example. Likewise, other kernels may be employed in connection with a non-linear SVM process. For this embodiment, a polynomial kernel was employed.

Having formulated an embodiment system for identifying or classifying marked content, such as images, for example, it is desirable to construct and evaluate performance. However, again, we note that this is merely a particular embodiment for purposes of illustration and claimed subject matter is not limited in scope to this particular embodiment or approach.

An image database comprising 7,560 JPEG images with quality factors ranging from 70 to 90 was employed. One third of these images were an essentially random set of pictures taken at different times and places with different digital cameras. The other two thirds were downloaded from the Internet. Each image was cropped (central portion) to the size of either 768×512 or 512×768. Likewise, for purposes of evaluation, chrominance components of the images are set to be zero while luminance coefficients are unaltered before data embedding.

This performance evaluation is focused on detecting Outguess, F5, and MB1 steganography. The codes for these three-approaches are publicly available. See http://www.outguess.org/; http://wwwrn.inf.tu-dresden.de/~wesffeld/f5.html; http://redwood.ucdavis.edu/phil/papers/iwdw03.htm Since there are quite a few zero BDCT coefficients in the JPEG images and the quantity of zero coefficients varies, the data embedding capacity differs from image to image. A common practice is to use the ratio between the length of hidden data and the number of non-zero BDCT AC coefficients as the measure of data embedding capacity for JPEG images. For OutGuess, 0.05, 0.1, and 0.2 bpc (bits per non-zero BDCT AC image were 7498, 7452, and 7215, respectively. For F5 and MB1, 0.05, 0.1, 0.2, and 0.4 bpc were embedded, which provides 7560 stego images. Note that the step size of MB1 embedding equals to two for this evaluation.

One half of the images (and the associated stego image) were randomly selected to train the SVM classifier and the remaining pairs were employed to evaluate the trained classifier. Approaches previously discussed, such as Farid's, Shi et al.'s, Fridrich's, as well the previously described embodiment were applied to evaluation detection of OutGuess, F5 and MB schemes. The results shown in Table 2 are the arithmetic average 20 of random experiments. Likewise, as mentioned previously, a polynomial kernel was employed. Unit here are %; TN stands for true negative rate, TP stands for true positive rate, and AR stands for accuracy.

TABLE 2

|  |  | Farid's | | | Shi et al.'s | | | Fridrich's | | | Our Proposed | | |
|---|---|---|---|---|---|---|---|---|---|---|---|---|---|
|  | bpc | TN | TP | AR | TN | TP | AR | TN | TP | AR | TN | TP | AR |
| OutGuess | 0.05 | 59.0 | 57.6 | 58.3 | 55.6 | 58.5 | 57.0 | 49.8 | 75.4 | 62.6 | 87.6 | 90.1 | 88.9 |
| OutGuess | 0.1 | 70.0 | 63.5 | 66.8 | 61.4 | 66.3 | 63.9 | 68.9 | 83.3 | 76.1 | 94.6 | 96.5 | 95.5 |
| OutGuess | 0.2 | 81.9 | 75.3 | 78.6 | 72.4 | 77.5 | 75.0 | 90.0 | 93.6 | 91.8 | 97.2 | 98.3 | 97.8 |
| F5 | 0.05 | 55.6 | 45.9 | 50.8 | 57.9 | 45.0 | 51.5 | 46.1 | 61.0 | 53.6 | 58.6 | 57.0 | 57.8 |
| F5 | 0.1 | 55.5 | 48.4 | 52.0 | 54.6 | 54.6 | 54.6 | 58.4 | 63.3 | 60.8 | 68.1 | 70.2 | 69.1 |
| F5 | 0.2 | 55.7 | 55.3 | 55.5 | 59.5 | 63.3 | 61.4 | 77.4 | 77.2 | 77.3 | 85.8 | 88.3 | 87.0 |
| F5 | 0.4 | 62.7 | 65.0 | 63.9 | 71.5 | 77.1 | 74.3 | 92.6 | 93.0 | 92.8 | 95.9 | 97.6 | 96.8 |
| MB1 | 0.05 | 48.5 | 53.2 | 50.8 | 57.0 | 49.2 | 53.1 | 39.7 | 66.9 | 53.3 | 79.4 | 82.0 | 80.7 |
| MB1 | 0.1 | 51.9 | 52.3 | 52.1 | 57.6 | 56.6 | 57.1 | 45.6 | 70.1 | 57.9 | 91.2 | 93.3 | 92.3 |
| MB1 | 0.2 | 52.3 | 56.7 | 54.5 | 63.2 | 66.7 | 65.0 | 58.3 | 77.5 | 67.9 | 96.7 | 97.8 | 97.3 |
| MB1 | 0.4 | 55.3 | 63.6 | 59.4 | 74.2 | 80.0 | 77.1 | 82.9 | 86.8 | 84.8 | 98.8 | 99.4 | 99.1 |

Likewise, to examine contributions made by features along different directions evaluation, reduced dimensionality of features was implemented, Hence, features from one direction at a time was implemented. The results shown in Table 4 are the arithmetic average of 20 random experiments with polynomial kernel.

TABLE 3

|  |  | Horizontal | | | Vertical | | | Main Diagonal | | | Minor Diagonal | | |
|---|---|---|---|---|---|---|---|---|---|---|---|---|---|
|  | bpc | TN | TP | AR | TN | TP | AR | TN | TP | AR | TN | TP | AR |
| OutGuess | 0.05 | 77.7 | 82.6 | 80.1 | 78.9 | 83.1 | 81.0 | 75.9 | 79.0 | 77.5 | 73.8 | 77.4 | 75.6 |
| OutGuess | 0.1 | 89.1 | 95.0 | 92.0 | 90.5 | 95.4 | 93.0 | 88.8 | 93.1 | 90.9 | 86.6 | 92.3 | 89.4 |
| OutGuess | 0.2 | 95.4 | 98.3 | 96.8 | 95.8 | 98.2 | 97.0 | 95.3 | 97.9 | 96.6 | 93.8 | 97.5 | 95.6 |
| F5 | 0.05 | 55.8 | 53.7 | 54.7 | 56.7 | 52.4 | 54.6 | 51.6 | 56.3 | 54.0 | 51.3 | 52.9 | 52.1 |
| F5 | 0.1 | 61.6 | 62.3 | 62.0 | 61.7 | 62.3 | 62.0 | 57.4 | 62.8 | 60.1 | 54.2 | 56.9 | 55.5 |
| F5 | 0.2 | 75.0 | 79.8 | 77.4 | 75.8 | 80.2 | 78.0 | 71.8 | 76.2 | 74.0 | 61.4 | 65.7 | 63.6 |
| F5 | 0.4 | 91.5 | 95.6 | 93.5 | 91.3 | 95.7 | 93.5 | 89.1 | 92.5 | 90.8 | 77.4 | 82.7 | 80.1 |
| MB1 | 0.05 | 69.9 | 72.4 | 71.1 | 70.6 | 72.8 | 71.7 | 67.6 | 69.6 | 68.6 | 66.1 | 67.4 | 66.7 |
| MB1 | 0.1 | 82.5 | 87.9 | 85.2 | 83.7 | 87.7 | 85.7 | 81.2 | 84.4 | 82.8 | 78.1 | 82.5 | 80.3 |
| MB1 | 0.2 | 92.5 | 96.4 | 94.4 | 94.1 | 96.8 | 95.5 | 92.8 | 95.6 | 94.2 | 90.1 | 93.9 | 92.0 |
| MB1 | 0.4 | 97.6 | 98.9 | 98.2 | 98.2 | 99.4 | 98.8 | 97.9 | 99.1 | 98.5 | 96.5 | 98.7 | 97.6 |

Comparing tables, it appears that combining directions enhances detection rate.

Figure 6:
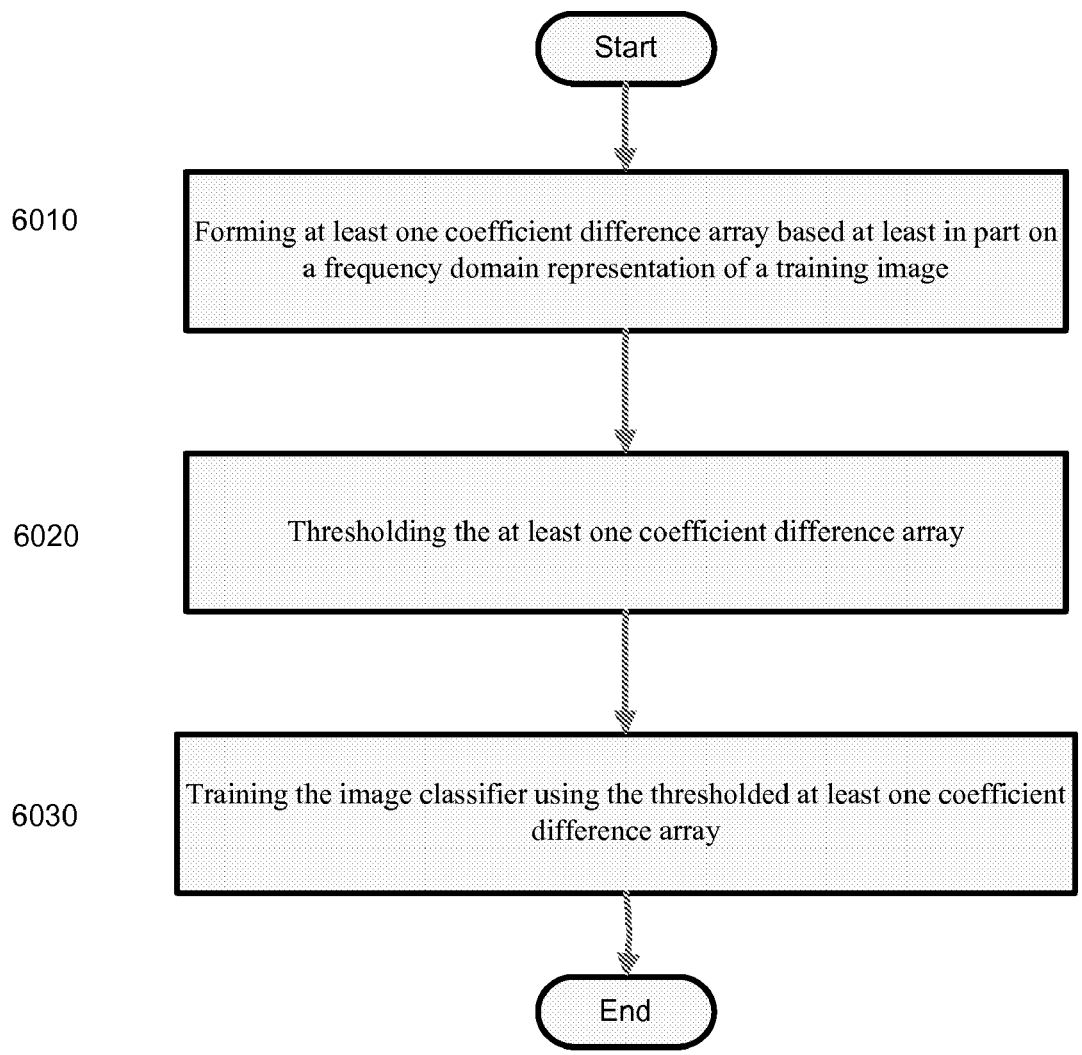
FIG. 6 illustrates elements implemented in an embodiment of the invention.

An embodiment of the invention is therefore directed to a method of processing an image. The method includes training an image classifier to obtain a trained classifier. The training includes forming at least one coefficient difference array based at least in part on a frequency domain representation of a training image, as shown in 6010 of FIG. 6. The training also includes thresholding the at least one coefficient difference array, as shown in 6020. The training further includes training the image classifier using the thresholded at least one coefficient difference array, as shown in 6030.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
   forming at least one coefficient difference array including a plurality of elements based at least in part on a frequency domain representation of at least one training image;
   thresholding the elements of the at least one coefficient difference array to obtain at least one thresholded coefficient difference array, wherein each of the elements of the at least one coefficient difference array is compared to a threshold value, and wherein each element larger than the threshold value is assigned the threshold value; and
   training an image classifier using the at least one thresholded coefficient difference array to obtain a trained hidden data image classifier for determining whether hidden data is present in at least one other image.

2. The method of claim 1, wherein said at least one coefficient difference array is formed for least one of the following directions: vertical, horizontal or diagonal.

3. The method of claim 1, wherein said at least one coefficient difference array comprises at least three coefficient difference arrays.

4. The method of claim 3, wherein said at least three coefficient difference arrays comprise a horizontal coefficient difference array, a vertical coefficient difference array and a diagonal coefficient difference array.

5. The method of claim 1, wherein said thresholding comprises non-uniform thresholding.

6. The method of claim 1, wherein said frequency domain representation of the training image comprises a block DCT representation.

7. The method of claim 1, further comprising:
   applying the trained classifier to a non-training image; and
   classifying said non-training image based at least in part on a value obtained from application of the trained classifier.

8. The method of claim 7, wherein said classifying comprises classifying said non-training image as being marked or unmarked.

9. The method of claim 1, wherein said image classifier comprises a variance process analyzer.

10. The method of claim 9, wherein said variance process analyzer uses an SVM process.

11. The method of claim 1, said training an image classifier further comprising forming said frequency domain representation by applying a magnitude operation to input frequency domain coefficients of said training image.

12. The method of claim 1, wherein said training an image classifier comprises performing said forming, said thresholding, and said training using multiple training images.

13. The method of claim 1 further comprising:
   calculating a transition probability matrix of the thresholded coefficient difference array.

14. The method of claim 1 wherein said at least one other image is a JPEG image.

15. An article of manufacture including a computer-readable medium having computer-executable instructions stored thereon, the instructions comprising:
   instructions for forming at least one coefficient difference array including a plurality of elements based at least in part on a frequency domain representation of at least one training image;
   instructions for thresholding the elements of the at least one coefficient difference array to obtain at least one thresholded coefficient difference array, wherein each of the elements of the at least one coefficient difference array is compared to a threshold value, and wherein each element larger than the threshold value is assigned the threshold value; and instructions for training an image classifier using the at least one thresholded coefficient difference array to obtain a trained hidden data image classifier for determining whether hidden data is present in at least one other image.

16. The article of claim 15, wherein said at least one coefficient difference array is formed for at least one of the following directions: vertical, horizontal or diagonal.

17. The article of claim 15, wherein said at least one coefficient difference array comprises at least three coefficient difference arrays.

18. The article of claim 17, wherein said at least three coefficient difference arrays comprise a horizontal coefficient difference array, a vertical coefficient difference array and a diagonal coefficient difference array.

19. The article of claim 15, wherein said thresholding comprises non-uniform thresholding.

20. The article of claim 15, further comprising:
instructions for applying the trained classifier to a non-training image; and
instructions for classifying said non-training image based at least in part on a value obtained from application of the trained classifier.

21. The article of claim 20, wherein said instructions for classifying comprise instructions for classifying said non-training image as being marked or unmarked.

22. The article of claim 15, wherein said image classifier comprises a variance process analyzer.

23. The article of claim 15, wherein said variance process analyzer uses an SVM process.

24. The article of claim 15, said instructions for training further comprising instructions for forming said frequency domain representation by applying a magnitude operation to input frequency domain coefficients of said training image.

25. The article of claim 15, wherein said instructions for training comprise instructions for performing said forming, said thresholding, and said training using multiple training images.

26. An apparatus comprising:
means for forming at least one coefficient difference array including a plurality of elements based at least in part on a frequency domain representation of at least one training image;
means for thresholding the elements of the at least one coefficient difference array to obtain at least one thresholded coefficient difference array, wherein each of the elements of the at least one coefficient difference array is compared to a threshold value, and wherein each element larger than the threshold value is assigned the threshold value; and
means for training an image classifier using the at least one thresholded coefficient difference array to obtain a trained hidden data image classifier for determining whether hidden data is present in at least one other image.

27. The apparatus of claim 26, wherein said means for said thresholding comprises means for non-uniform thresholding.

28. The apparatus of claim 26, further comprising:
means for applying the trained classifier to a non-training image; and
means for classifying said non-training image based at least in part on a value obtained from application of the trained classifier.

29. The apparatus of claim 28, wherein said means for classifying comprises means for classifying said non-training image as being marked or unmarked.

30. The apparatus of claim 26, wherein said image classifier comprises variance process analyzer.

31. The apparatus of claim 30, wherein said analysis of variance process comprises an SVM process.

32. The apparatus of claim 26, wherein said means for training further comprises means for forming said frequency domain representation by applying a magnitude operation to input frequency domain coefficients of said at least one training image.

33. The apparatus of claim 26, wherein said means for training comprises means for performing said forming, said thresholding, and said training using multiple training images.

34. An electronic computing device, comprising:
at least one processor configured to obtain a trained hidden data image classifier, wherein said obtaining comprises:
forming at least one coefficient difference array including a plurality of elements based at least in part on a frequency domain representation of at least one training image;
thresholding the elements of the at least one coefficient difference array to obtain at least one thresholded coefficient difference array, wherein each of the elements of the at least one coefficient difference array is compared to a threshold value, and wherein each element larger than the threshold value is assigned the threshold value; and
training an image classifier using the at least one thresholded coefficient difference array.

35. A method comprising:
using at least one processor to form at least one coefficient difference array including a plurality of elements based at least in part on a frequency domain representation of at least one training image;
using the at least one processor to threshold the elements of the at least one coefficient difference array to obtain at least one thresholded coefficient difference array, wherein each of the elements of the at least one coefficient difference array is compared to a threshold value, and wherein each element larger than the threshold value is assigned the threshold value; and
using the at least one processor to train an image classifier using the at least one thresholded coefficient difference array to obtain a trained hidden data image classifier for determining whether hidden data is present in at least one other image.

* * * * *

UNITED STATES PATENT AND TRADEMARK OFFICE
CERTIFICATE OF CORRECTION

| | |
|---|---|
| PATENT NO. | : 7,925,080 B2 |
| APPLICATION NO. | : 11/331767 |
| DATED | : April 12, 2011 |
| INVENTOR(S) | : Shi et al. |

Page 1 of 1

It is certified that error appears in the above-identified patent and that said Letters Patent is hereby corrected as shown below:

Title page, item (56), under "Other Publications", in Column 2, line 5, delete "Patentabilty" and insert -- Patentability --.

Column 12, line 14, in Claim 2, delete "for least" and insert -- for at least --.

Column 13, line 35, in Claim 23, delete "claim 15," and insert -- claim 22, --.

Signed and Sealed this
Thirteenth Day of September, 2011

David J. Kappos
*Director of the United States Patent and Trademark Office*